No. 897,346. PATENTED SEPT. 1, 1908.
F. BREITENSTEIN.
WATER MOTOR.
APPLICATION FILED FEB. 14, 1907.
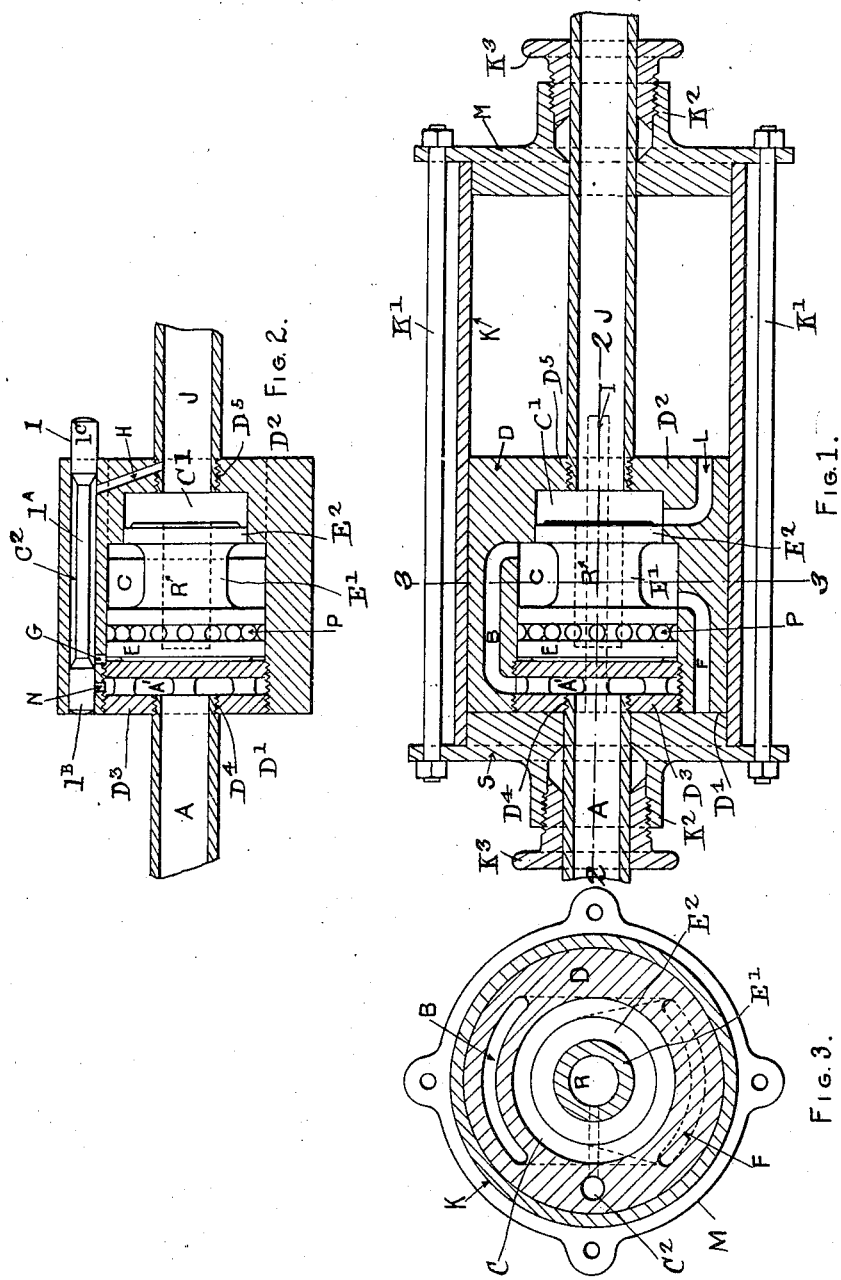
WITNESSES:
INVENTOR.
Frank Breitenstein.
BY Frank Breitenstein.
ATTORNEY.

UNITED STATES PATENT OFFICE.

FRANK BREITENSTEIN, OF DENVER, COLORADO.

WATER-MOTOR.

No. 897,346.     Specification of Letters Patent.     Patented Sept. 1, 1908.

Application filed February 14, 1907. Serial No. 357,410.

*To all whom it may concern:*

Be it known that I, FRANK BREITENSTEIN, a citizen of the United States of America, residing in the city and county of Denver and State of Colorado, have invented a new and useful Water-Motor, of which the following is a specification.

My invention relates to improvements in water motors, and the objects of my invention are: first, to provide a motor in which a positively operating differential valve mechanism is used to reverse the reciprocal strokes of the piston, and second, to provide a simple, durable and practical water motor.
I attain these objects by the mechanism illustrated in the accompanying drawing, in which, Figure 1 is a central horizontal section of a motor embodying my invention. Fig. 2 is a central horizontal sectional view of the valve mechanism of Fig. 1, taken through line 2—2 of Fig. 1, and Fig. 3 is a transverse view of Fig. 1 on line 3—3.

Similar letters of reference refer to similar parts throughout the several views.

Referring to the drawings, the letter K designates the cylinder, and M and S the cylinder-heads of my motor. These cylinder-heads may be secured to the opposite ends of the cylinder in any suitable manner, but I preferably bolt them together by long bolts $K^1$, which extend through both cylinder-heads along the sides of the cylinder. Both cylinder-heads are provided with stuffing boxes $K^2$, and glands $K^3$, which are operatively arranged at the axial centers of their outer sides.

A piston D is reciprocally fitted in the cylinder, and is provided with a main valve chamber, which is made in two different diameters, C and $C^1$, the largest portion C of which extends into the piston from its left hand end $D^1$, and extends throughout its central portion, and the small portion $C^1$ extends from the bottom of the chamber C to near the right hand end $D^2$ of the piston; thus forming an extension of the main portion of the valve chamber. The entrance end of the larger portion of this valve chamber at the end $D^1$ of the piston, is threaded, and is closed by a disk $D^3$, which is threaded and fitted rigidly in it. This disk is provided with an axial aperture $D^4$, in which one end of a hollow piston A is threaded, the opposite end of which extends through the stuffing box and gland of the cylinder-head S a predeter-
mined distance, which is enough longer than the stroke of the piston in the cylinder to admit of its being properly connected to a supply of water under pressure or to any other suitable motive fluid. The opposite end $D^2$, of the piston, is provided with an axial aperture $D^5$, which extends into the smaller portion of the valve chamber. This axial aperture $D^5$, is threaded, and a hollow piston J, which I term the exhaust piston is threaded at one end to it, the opposite end of which extends through the stuffing box and gland of the cylinder-head M a distance enough longer than the stroke of the piston to permit a hose or pipe to be attached to carry the exhaust of the cylinder to waste.

In the two portions C and $C^1$ of the valve chamber, I place a valve E, which I term the main valve, and which has a stem portion $E^1$, and a supplementary valve end $E^2$, on the opposite end of the stem from the valve E. The valve E is reciprocally fitted in the largest portion E of the valve chamber, and its supplementary end portion is reciprocally fitted in the smaller portion $C^1$ of the valve chamber.

Through the shell of the piston, between the wall of the valve chamber C and the periphery of the piston, I form an auxiliary valve port $C^2$ which extends through the piston from end to end parallel with the axis of the piston, and in this auxiliary port I reciprocally fit an auxiliary valve 1, which comprises a central stem portion $1^A$ of smaller diameter than the port $C^2$, which is provided at its opposite ends with valve $1^B$ and $1^C$, which are fitted in the port $C^2$ at each end of it.

The stem and the valves at the ends of the stem extend through and beyond the piston far enough to strike the cylinder heads at the ends of the opposite strokes of the piston, and are moved sufficiently in the port $C^2$ to operatively open and close in alternate order a pair of main valve operating ports N and H, (see Fig. 2,) which are positioned in the opposite ends of the port $C^2$ in the path of the valves at the ends of the valve stem.

The port N is the water or other motive fluid inlet valve, and it is positioned at the left hand end of the piston in the path of the valve $1^B$, and registers with a circumferential row of radial ports $A^1$, formed in the disk $D^3$, that is secured in the end of the valve chamber C. These radial ports $A^1$ register with the axial aperture $D^4$, and consequently with the water inlet piston A. A port G extends from the auxiliary port $C^2$, into the main valve chamber C, and is the water or fluid inlet port from the auxiliary port $C^2$, into the main valve chamber C, and it is positioned in the left hand end of the port $C^2$, in the path of the valve $1^B$, and is positioned adjacent to the port N.

The port H, is the exhaust port of the auxiliary port $C^2$, and it is positioned in the right hand end of the valve port $C^2$ in the path of the valve $1^c$, and extends to and connects with the exhaust piston J. The piston is also provided with a port B which is preferably positioned at the quarter angle of the piston to the auxiliary valve $1^A$ and extends from the radial ports $A^1$, to the opposite end of the main valve chamber C. This port B admits the water or other motive fluid to the opposite end of the valve chamber C. And in the piston preferably on the opposite side of it from the port B, an exhaust port F is formed, which extends from the left hand end of the piston to the central portion of the main valve chamber C, and the main valve E is provided with a circumferential row of radial ports P, which are positioned to register with the exhaust port F during each reciprocal movement of the main valve E.

The radial ports P of the main valve E extend into an axial port R formed in the axial center of this main valve E, which extends into its axial center from its supplementary valve end $E^2$, far enough to register with these radial ports P, and from the right hand end of the piston an exhaust port L extends into the supplementary valve chamber $C^1$, which through the supplementary valve chamber communicates with the exhaust piston J.

The operation of my improved water motor is as follows: The motive fluid which is preferably water under pressure, enters the hollow piston A, into the disk $D^3$, and flows through the ports $A^1$, into the port B, and thence to the chamber C, and assuming that the piston is at the left hand end of its strokes as shown in Figs. 1 and 2, the port N will be closed by the auxiliary valve $1^B$, of the auxiliary valve port $C^2$, while the ports G and H will be open, and the water that flows into the main valve chamber C will move the valve E to the left and uncover the port F, and thus permit the water to pass into and through the port F, to the left hand end of the cylinder, and force the piston to the right hand end of the cylinder, and at the same time the valve E moves to the left it opens the exhaust port L, allowing the exhaust water in the right end of the cylinder to flow through the port L and supplementary valve chamber into the exhaust piston J, while the water on the left of the valve escapes through ports G and H to the exhaust J. The auxiliary valve $1^c$ strikes the cylinder-head M and is moved towards the opposite or left hand end of the cylinder far enough to uncover the port N in the auxiliary port $C^2$, and covers and closes the port H, thereby admitting the water pressure into auxiliary port $C^2$, from which it flows through port G into main valve chamber C back of main valve E, and moves it to the right, causing the supplementary valve $E^2$ to cover and close the exhaust port L, and the exhaust ports P in the main valve E to register with the exhaust port F, allowing the exhaust water in the left hand end of the cylinder to exhaust through ports F and P and R into exhaust piston J, and as the water pressure is flowing constantly through the inlet port B into the valve chamber C, it flows through the port L into the right hand end of the cylinder, and reverses the movement of the piston, driving it to the left hand end of the cylinder, where the auxiliary valve strikes the cylinder-head and is moved back into the position shown in the Figs. 1 and 2, and the main valve E is again reversed by the water pressure through port B, which moves the main valve to the left into the position shown in Figs. 1 and 2 and opens the port F, the water on the left of the valve escaping through ports G and H, to the exhaust J. The water then flows to the left end of the cylinder and reverses the piston's stroke and again opens the port L to the exhaust water in the right end of the cylinder, and the valve movement is repeated as before described by the continuously inflowing water in coöperation with the shifting of the auxiliary valve at the ends of the piston's reciprocal strokes.

My invention is simple, practical, and durable, and not apt to get out of order.

Having described my invention, what I claim as new and desire to secure by Letters Patent, is:

1. In a water motor, the combination with the cylinder, of a piston reciprocally mounted therein, a hollow motive fluid inlet piston rod and a hollow exhaust piston rod connected to said piston and extending through the opposite ends of said cylinder, a differential valve mechanism mounted in said piston, and a coöperating set of motive fluid ports in said piston arranged to admit and to exhaust the fluid pressure from the alternate ends of said cylinder in alternate order.

2. In a water motor, the combination with the cylinder, of a piston reciprocally mounted therein, provided with hollow water inlet and exhaust pistons extending from its opposite sides through the opposite ends of said piston, a main valve chamber in said piston of two diameters, a main valve of two diameters fitting the two diameters of said chamber, an auxiliary valve and port in said piston adjacent to said main valve and chamber, said auxiliary valve being arranged to extend beyond the sides of said piston and strike the opposite ends of said cylinder and be moved a predetermined distance thereby, and a series of coöperating water-inlet and exhaust ports arranged between said ports and valves and operatively connected to said water inlet and exhaust piston rods.

3. In a water motor, the combination with the cylinder, of the piston provided with oppositely extending hollow piston rods, one of which is adapted to admit water to said piston, and the other to exhaust water from said piston, a main valve chamber and valve in said piston, an auxiliary valve port and valve adjacent to said main valve and valve chamber, said auxiliary valve being arranged to strike the opposite ends of said cylinder at the ends of said piston's reciprocal strokes, a pair of ports leading from said main valve chamber to the opposite ends of said piston, a fluid inlet into said auxiliary port from said fluid inlet piston rod, an exhaust port from said auxiliary port to said exhaust piston rod, and coöperating fluid inlet and exhaust ports extending in said main valve and piston.

4. In a water motor, the combination of the cylinder, the piston head reciprocally mounted in said cylinder, the water inlet and exhaust piston rods connected at one end to said piston head, and the main valve chamber of two diameters in said piston head, with the main valve of two diameters reciprocally mounted in said main valve chamber, said piston head and main valve being provided with suitable coöperating water inlet and exhaust ports, a separate auxiliary valve chamber in said piston head, and an auxiliary valve slidably mounted within said auxiliary valve chamber, coöperating ports extending from said water inlet piston rod and from said main valve chamber and from said exhaust piston rod to said auxiliary valve chamber, said auxiliary valve being arranged to extend beyond said piston head far enough to strike the opposite ends of said cylinder at the ends of its opposite reciprocal strokes, and be moved to control the operative movement of said main valve.

5. In a water motor, the combination with the cylinder, of the piston and hollow water inlet and exhaust piston rods, a main valve having valved end portions of two different diameters fitting reciprocally in a chamber of two diameters in said piston, an auxiliary valve and valve chamber independent of said main valve, said auxiliary valve being provided with a port portion at its center and with a valve portion at its opposite ends, a coöperating set of water inlet and exhaust ports in said piston adapted to admit and to exhaust water from the opposite ends of said cylinder in alternate order, said auxiliary valve being arranged to engage the opposite ends of said cylinder and to operatively control said main valve.

6. In a water motor, the combination with the cylinder, of a piston, hollow water inlet and exhaust piston rods projecting from the opposite sides of said piston, a main valve chamber in said piston a main valve in the main valve chamber of said piston provided with an axial inlet port communicating with said inlet piston-rod, a circumferential row of radial ports in said main valve, a port leading from said main valve chamber to one end of said piston, a second port leading from said main valve chamber to the opposite end of said cylinder, a supplementary valve portion on said main valve arranged to control said second port, an independent auxiliary port in said piston, an auxiliary valve in said auxiliary port comprising a stem of smaller diameter than said auxiliary port having a valve portion on each end fitting said auxiliary port, said auxiliary valve being of enough greater length than said piston to extend beyond opposite sides and strike the opposite ends of said cylinder at the ends of said piston's reciprocal strokes, and thereby operatively move said auxiliary valve a predetermined distance, a water inlet port from said water inlet piston rod into said auxiliary port arranged to be controlled by the valve portion of one end of said auxiliary valve, an exhaust port leading from the opposite end of said auxiliary port into said exhaust piston rod and arranged to be controlled by the opposite valve portion of said auxiliary valve, an inlet port from said auxiliary port to one end of said main valve chamber, and an inlet port from said inlet piston rod to the opposite end of said main valve chamber.

In testimony whereof I affix my signature in presence of two witnesses.

FRANK BREITENSTEIN.

Witnesses:
   G. SARGENT ELLIOTT,
   ADELLA M. FOWLE.